(12) United States Patent
Lehman

(10) Patent No.: US 10,336,569 B1
(45) Date of Patent: Jul. 2, 2019

(54) APPARATUS FOR ORGANIZING CORD ATTACHED DEVICES

(71) Applicant: Wesley Lehman, Dwight, IL (US)

(72) Inventor: Wesley Lehman, Dwight, IL (US)

( * ) Notice: Subject to any disclaimer, the term of this patent is extended or adjusted under 35 U.S.C. 154(b) by 27 days.

(21) Appl. No.: 15/610,699

(22) Filed: Jun. 1, 2017

(51) Int. Cl.
*A01M 31/06* (2006.01)
*B65H 75/34* (2006.01)

(52) U.S. Cl.
CPC .............. *B65H 75/34* (2013.01); *A01M 31/06* (2013.01)

(58) Field of Classification Search
CPC ......... B65D 85/04; A01M 31/06; B65H 75/34
USPC ..... 206/315.11, 804, 254, 702, 579; 43/5, 2, 43/54.1
See application file for complete search history.

(56) References Cited

U.S. PATENT DOCUMENTS

| | | | | |
|---|---|---|---|---|
| 2,242,509 A | * | 5/1941 | Coalson | A01K 91/18 43/57.3 |
| 5,582,292 A | * | 12/1996 | Cabe | A63B 71/0036 206/315.1 |
| 5,893,454 A | * | 4/1999 | Hermanek | A24F 25/02 206/205 |
| 7,347,024 B1 | * | 3/2008 | Vest | A01M 31/06 43/3 |
| 9,615,568 B2 | * | 4/2017 | Harding | A01M 31/06 |

* cited by examiner

*Primary Examiner* — Steven A. Reynolds

(74) *Attorney, Agent, or Firm* — The Law Offices of Konrad Sherinian

(57) ABSTRACT

A packing device for organizing objects with cords attached includes a tube and a pulling assembly operatively coupled to the tube. The pulling assembly is adapted to pull the cords inside the tube to avoid tangling and assist managing the objects. The pulling assembly includes a pulling string with a puller attached at one end and a fastener attached at the other end. The fastener attaches the cords to the pulling assembly. The fastener can be attached to different position on the string to accommodate cords of different lengths. The puller is pulled and then placed in a locked position. The puller can be a different fastener that is attached to an anchor of the tube in the locked position. Alternatively, the puller moves in a track incorporated in the tube. The track can further incorporate a lip for locking the puller in position.

10 Claims, 3 Drawing Sheets

APPARATUS FOR ORGANIZING CORD ATTACHED DEVICES

CROSS REFERENCE TO RELATED APPLICATIONS

None.

FIELD OF THE DISCLOSURE

The present invention generally relates to a container device, and more particularly relates to a container for handling cord attached devices. More particularly still, this disclosure relates to a packing device for organizing cord attached decoys.

DESCRIPTION OF BACKGROUND

People use various tools with cords in their daily life. For example, enthusiastic hunters use decoys to lure animals into a particular spot, such as a pond, before they shoot the animals. A cord is usually attached to a decoy for various purposes. An illustrative waterfowl decoy is shown in FIG. 1 and generally indicated at 100. The decoy 100 includes an animal replica 102, such as a goose replica or a duck replica, and a cord (such as a cable or a plastic or fiber cord) 104. The cord 104 is attached to the animal replica 102 at one end and has a loop 106 at the other end. The cord 104 and the loop 106 can be used to attach the decoy 100 to an anchor (such as a piece of stone, lead or metal) 108 submerged in a pond of water. The anchor 108 serves as a weight. Accordingly, while anchored and floating on the water in the pond, the animal replica 102 is limited to a particular area within the pond, and not moved to an area determined solely by wind and water wave.

Moreover, the cords 104 help handle and organize multiple decoys 100. For instance, a hunter can grab and hold twenty cords 104 to handle twenty decoys 100 by hands, while it is not convenient or possible for the hunter to handle twenty animal replicas 102 by two hands.

However, the replicas 102 and the cords 104, or other types of objects with cords attached to them, are oftentimes tangled together. It takes time to untangle the replicas 102 and the cords 104. Furthermore, the tangled decoys 100 are unsightly. Accordingly, there is a need for a device to organize multiple cord attached apparatuses and pack the cords to avoid tangling and other problems.

Objects of the Disclosed System, Method, and Apparatus

Accordingly, it is an object of this disclosure to provide a packing device for handling objects with attached cords.

Another object of this disclosure is to provide a packing device for handling objects with attached cords without tangling.

Another object of this disclosure is to provide a packing device for handling objects with attached cords that is convenient to use.

Another object of this disclosure is to provide a packing device for handling objects with attached cords that is not expensive.

Another object of this disclosure is to provide a packing device that significantly reduce the time it takes to deploy and retrieve decoys.

Another object of this disclosure is to provide a packing device that allows its user to haul decoys and equipment easily over a terrain.

Another object of this disclosure is to provide a packing device that allows better storage utilization.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a packing device. The packing device includes a packing tube and a pulling assembly operatively coupled to the tube. The pulling assembly includes a string, a puller attached to the string at a first end of the string, and a first fastener attached to a second end of the string. The string and the first fastener are adapted to be pulled inside the tube when the puller is pulled. The first fastener is adapted to be attached to the cords. The packing device can further includes an anchor attached to the tube, and a second fastener. The second fastener is adapted to be attached to the anchor when the packing device is in a locked position. In one implementation, the anchor includes a loop; the first fastener is a carabiner or a spring snap; and the second fastener is a carabiner or a spring snap. Moreover, the string can incorporate a set of loops at the first end, and the first fastener is attached to one of the set of loops. In a different implementation, the puller includes a handle, a vertical leg extended from the handle, a horizontal leg extended from the vertical leg, and a connector attached to the horizontal leg. The horizontal leg is adapted to move inside a cavity of the tube and the vertical leg is adapted to move in the track. Moreover, the track can incorporate a lip. The lip receives the vertical leg when the packing device is in a locked position.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
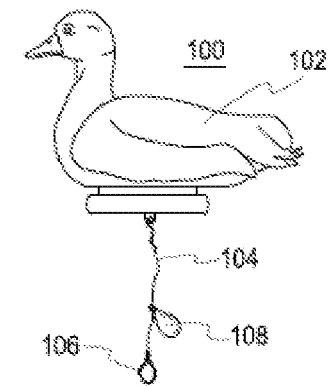
FIG. 1 is a front perspective view of a decoy with a cord attached in accordance with this disclosure.
Figure 2:
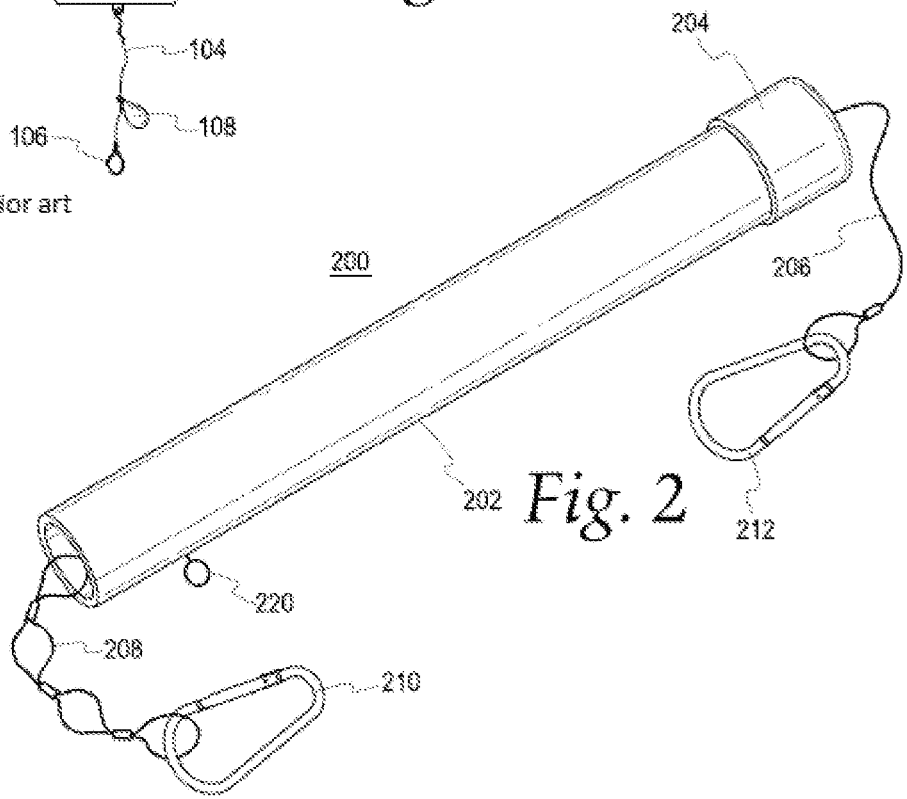
FIG. 2 is a front perspective view of a packing device in accordance with this disclosure.

Turning to the Figures and to FIG. 2 in particular, a perspective view of a packing device is shown and generally indicated at 200. The illustrative packing device 200 includes a packing tube 202, an anchor 220 mounted to the tube 202, and a pulling assembly. In one embodiment, the anchor 220 includes a closed ring for coupling with the pulling assembly when the packing device 200 is in a locked position. The tube 202 is made of, for example, medal, wood, plastic or composite materials. The tube 202 can be constructed with a length fitting for objects like the decoy 100. In one embodiment, the tube 202 is three feet in length and two inches in diameter.

The pulling assembly includes a string 206, a fastener 212 attached to one end of the string 206, and a fastener 210 attached to the opposite end of the string 206. In one implementation, the fasteners 210-212 are two carabiners attached to the string 206 via two loops on the opposite ends of the string 206. The string 206 is flexible and made of, for example, fiber or plastic. The string 206 can also be a cable. For the tube 202 to fit for cords of different length, the string 206 incorporates more than one loop 208 at one end. When the cord 104 is longer, meaning closer to the length of the tube 202, the fastener 210 is then attached to a loop 208 closer to the fastener 212. In contrast, when the cord 104 is shorter, the fastener 210 is then attached to a loop 208 that is farther from the fastener 212.

Figure 3:
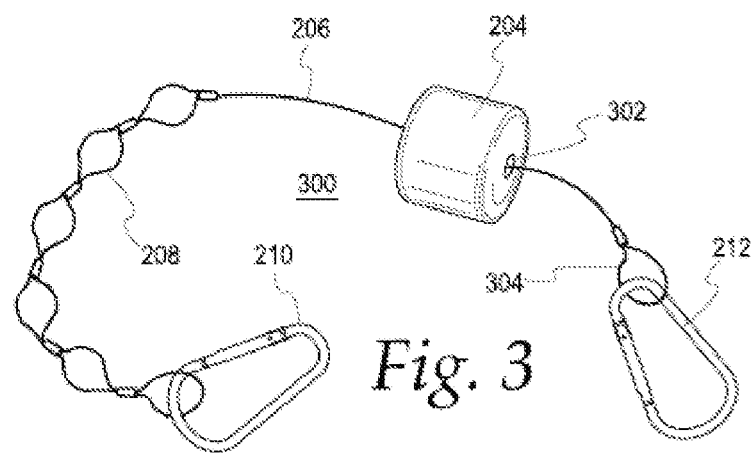
FIG. 3 is a front perspective view of a packing assembly in accordance with this disclosure.

The pulling assembly, indicated at 300, is further illustrated and shown in FIG. 3. In a further implementation, the packing device 200 includes a cap 204. The cap 204 is adapted to be attached to the tube 202 at one end. When attached to the tube 202, the cap 204 is affixed to the tube 202 by, for example, friction. The cap 204 incorporates an aperture 302, through which the string 206 penetrates and moves. The aperture 302 is big enough for the string 206 to penetrate through. In a further implementation, the aperture 302 is big enough for the loop 304 to pass through. However, it is not big enough for the fasteners 210-212 to pass through. As used herein, the pulling assembly 300 does not include the cap 204.

Figure 4:
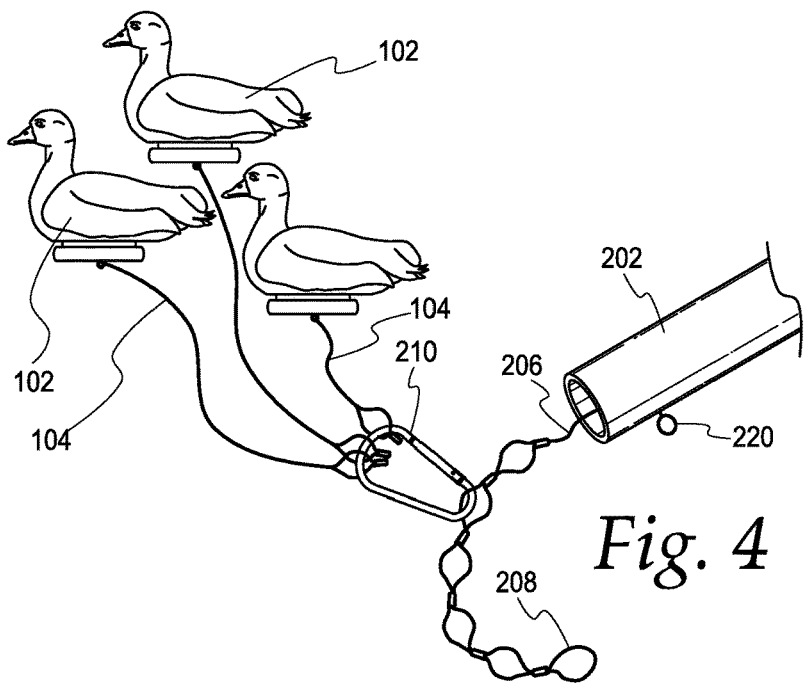
FIG. 4 is a front perspective view of a packing device with a set of cord attached objects in a loading position in accordance with this disclosure.

To organize a set (meaning one or more) of devices, such as the decoy 100, using the packing device 200, a user first attaches the loops 106 of the cords 104 to the fastener 210. The loading process is further illustrated by reference to FIG. 4. Second, the user pulls the fastener 212 away from the tube 202. The fastener 212 is thus also referred to herein as a puller. Accordingly, the cords 104 are pulled into the internal cavity of the tube 202. The user then attaches the fastener 212 to the anchor 220. The packing device 200 is now in a locked position. The cords 104 are placed in the tube 202 in its extended position, and not tangled with the objects 102 or other objects. Further, the cords 104 are not tangled with each other inside the tube 202. Moreover, the packing device 200 is convenient to operate and not expensive to make.

Figure 5:
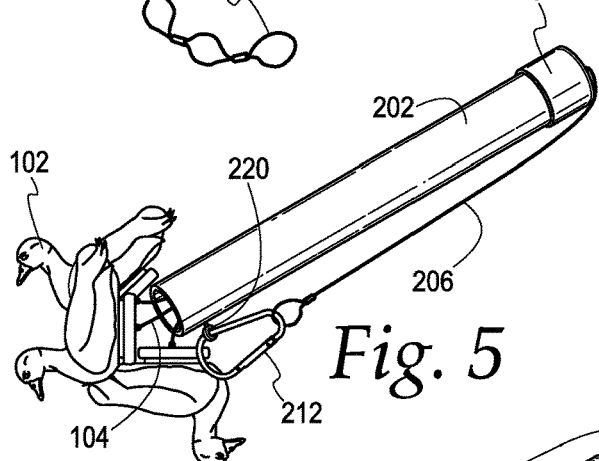
FIG. 5 is a front perspective view of a packing device with a set of cord attached objects in a locked position in accordance with this disclosure.

The locked position is further illustrated by reference to FIG. 5. At the locked position, only a small portion of the cords 104 are exposed outside of the tube 202, and the set of animal replicas 102 are all disposed within a close vicinity of the open end of the tube 202. Depending the length of the cords 104 and the length of the tube 202, the user can attach the fastener 210 to a particular loop 208. As used herein, the pulling assembly 300 is said to be operatively coupled to the packing tube 202.

To release the objects 102 from the packing device 200, the user detach the fastener 212 from the anchor 220, and pulls the tube 202 away from the objects 102. The cords 104 are then released from the tube 202; and the user can then release the cords 104 from the fastener 210.

Figure 6:
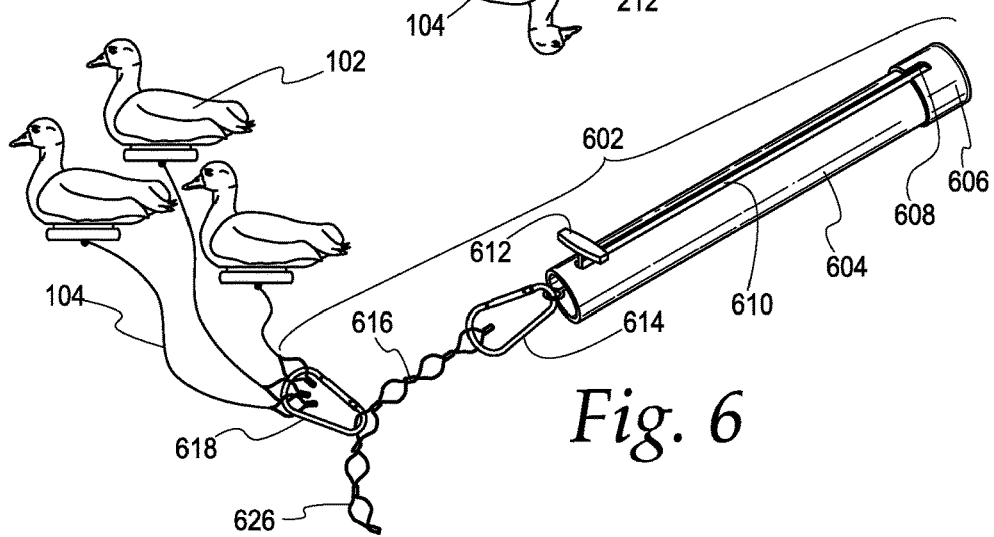
FIG. 6 is a front perspective view of a packing device with a set of cord attached objects in a loading position in accordance with this disclosure.

Referring to FIG. 6, a front perspective view of an alternate embodiment of the packing device 200 is shown and generally indicated at 602. The packing device 602 includes a packing tube 604 incorporating an elongated track 610, and a pulling assembly. The track 610 is an opening in the tube 604. The pulling assembly includes a string 616 including a set of loops 626, two fasteners 614 and 616 attached to the string 616 via the loops 626, and a puller 612 operatively coupled to the fastener 614. The puller 612 is adapted to move along the track 610 to load or release the objects 102.

Figure 9:
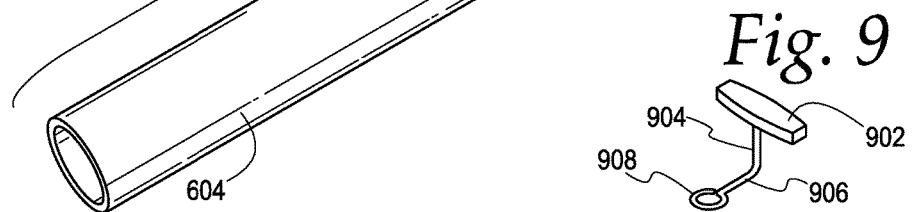
FIG. 9 is a front perspective view of a handle of a packet device in accordance with this disclosure.

An illustrative implementation of the puller 612 is further shown in FIG. 9. The puller 612 includes a handle 902, a horizontal leg 906, a vertical leg 904 connecting the handle 902 and the horizontal leg 906, and a connector 908 attached to the leg 906. The legs 904-906, the handle 902 and the connector 908 can be integrally formed or separate parts attached together. The angle between the vertical leg 904 and the horizontal leg 906 can be a right angle, an acute angle or an obtuse angle. When moving along the track 610, the leg 906 moves inside the internal cavity of the tube 604 and the leg 904 moves in the track 610. As used herein, the vertical leg 904 is said to be extended from the handle 902, and the horizontal leg 906 is said to be extended from the vertical leg 904.

Figure 7:
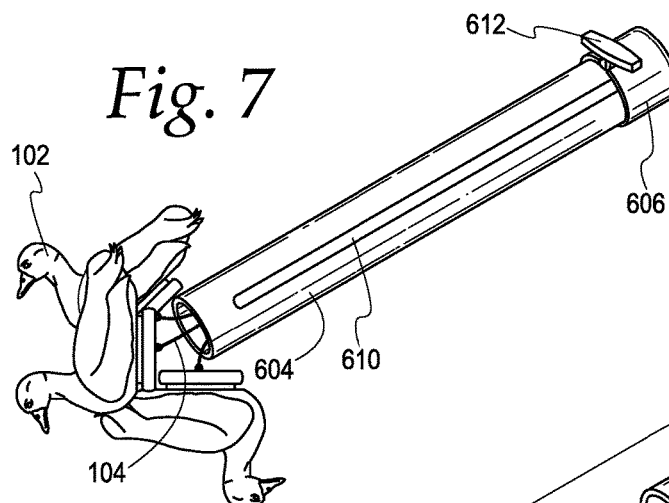
FIG. 7 is a front perspective view of a packing device with a set of cord attached objects in a locked position in accordance with this disclosure.

Returning to FIG. 6, the cords 104 are attached to the fastener 618 via the loops 106. The fastener 614 connects with both the string 616 and the puller 612. At this loading position, the objects 102 are coupled to the packing device 602. The user then pulls the puller 612 by its handle 902 along the track 610 to the opposite end of the tube 604. As shown in FIG. 7, the puller 612 is then placed in a locked position at the other end of the tube 604. The locking mechanism is further illustrated by reference to FIG. 8.

Figure 8:
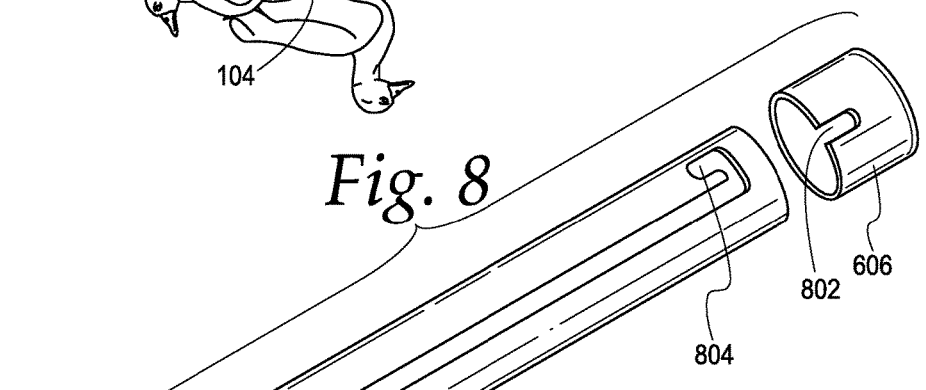
FIG. 8 is a front perspective view of a tube and a cap of a packing device in accordance with this disclosure.

Referring to FIG. 8, a front perspective view of the tube 604 and a cap 606 of the packing device 602 is shown. The track 610 incorporates a lip 804 while the cap 606 incorporates a notch 802. When the user loads the objects 102, she/he adjusts the cap 606 such that the notch 802 is aligned with the track 610. Once the puller 612 is pulled to the end of the track 610, the leg 904 is disposed in the notch 802. At this point, the user turns the cap 606 towards the lip 804. The leg 904 is then disposed inside the lip 804. At this position, the cap 606 blocks the track 610. Accordingly, the puller 612 is locked and cannot be moved down the track 610. The locked position is illustrated in FIG. 7.

Figure 10:
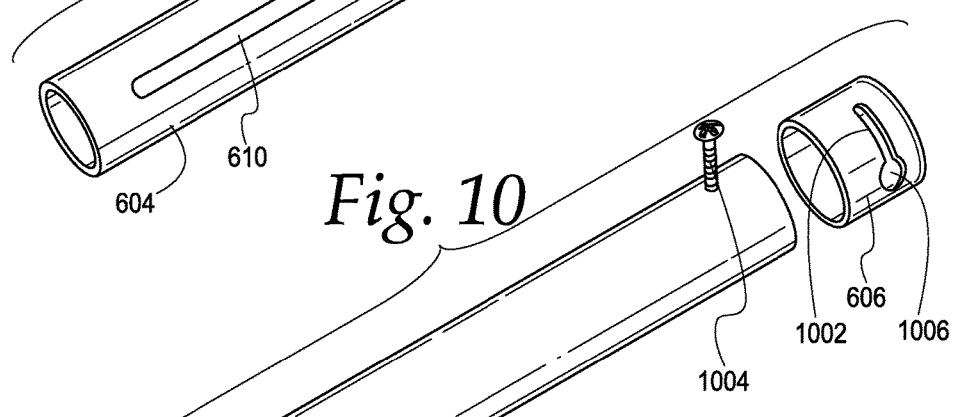
FIG. 10 is a front perspective view of a tube and a cap of a packing device in accordance with this disclosure.

In a further implementation in accordance with the present teachings that is shown in FIG. 10, the packing device 602 includes a cap stopper 1004 while the cap 606 incorporates a locking track 1002. For example, when the cap 606 is placed on the tube 604, the cap stopper 1004 penetrate through the locking track 1002 and is then attached to the tube 604. The cap stopper 1004 can be, for example, a threaded nut with a nut cap. When the cap 606 is turned into the locked position, the nut cap is then operated to fit in the enlarged end 1006 of the locking track 1002, and thus locks the puller 612 into the lip 804. The packing device 602 is convenient to operate and not expensive to make.

Obviously, many additional modifications and variations of the present disclosure are possible in light of the above teachings. Thus, it is to be understood that, within the scope of the appended claims, the disclosure may be practiced otherwise than is specifically described above. For example, the packing device 200 incorporates the stopper 1004 and the cap 204 incorporates the locking track 1002.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A packing device for organizing objects with attached cords, said packing device comprising:
   i. a packing tube; and
   ii. a pulling assembly having a string, a puller attached to said string at a first end of said string, and a first fastener attached to a second end of said string, wherein:
      (1) said string and said first fastener are adapted to be pulled inside said tube when said puller is pulled;
      (2) said first fastener is adapted to be attached to said cords; and
      (3) said tube incorporates an elongated track wherein said puller moves along said track when said cords are pulled into said tube, and wherein said elongated track does not extend to either end of said tube.

2. A packing device for organizing objects with attached cords, said packing device comprising:
   i. a packing tube incorporating an elongated track; and
   ii. a pulling assembly having a string, a puller attached to said string at a first end of said string, and a first fastener attached to a second end of said string, wherein:
      (1) said string and said first fastener are adapted to be pulled inside said tube when said puller is pulled;
      (2) said first fastener is adapted to be attached to said cords;
      (3) said puller is adapted to move along said track when said cords are pulled into said tube said tube; and
      (4) said puller includes a handle, a vertical leg extended from said handle, a horizontal leg extended from said vertical leg and a connector attached to said horizontal leg, wherein said horizontal leg is adapted to move inside a cavity of said tube and said vertical leg is adapted to move in said track.

3. The packing device of claim 2 wherein said track incorporates a lip, wherein said lip receives said vertical leg when said packing device is in a locked position.

4. The packing device of claim 3 further comprising a cap, wherein said cap incorporates a notch for receiving said vertical leg.

5. The packing device of claim 3 further comprising a cap, wherein:
   i. said packing tube has a cap stopper;
   ii. said cap incorporates a locking track, wherein said locking track receives said cap stopper when said cap is turned on said tube; and
   iii. said locking track incorporates an enlarged end for receiving a nut cap of said cap stopper when said packing device is in a locked position.

6. A packing device for organizing objects with attached cords, said packing device comprising:
   i. a packing tube;
   ii. a pulling assembly having a string, a puller attached to said string at a first end of said string, and a first fastener attached to a second end of said string, wherein:
      (1) said string and said first fastener are adapted to be pulled inside said tube when said puller is pulled; and
      (2) said first fastener is adapted to be attached to said cords;
      (3) said puller includes a second fastener; and
   iii. a cap adapted to be attached to said packing tube, wherein said cap incorporates an aperture that receives said string.

7. The packing device of claim 6 further comprising an anchor mounted on the tube, wherein: said second fastener is adapted to be attached to said anchor when said packing device is in a locked position.

8. The packing device of claim 7, wherein:
   i. said anchor includes a loop;
   ii. said first fastener is a carabiner or a spring snap; and
   iii. said second fastener is a carabiner or a spring snap.

9. The packing device of claim 8, wherein said string incorporates a set of loops at said first end wherein said first fastener is attached to one of said set of loops.

10. The packing device of claim 6, wherein said string incorporates a set of loops at said first end wherein said first fastener is attached to one of said set of loops.

* * * * *